United States Patent
Chan et al.

(10) Patent No.: US 12,381,759 B2
(45) Date of Patent: Aug. 5, 2025

(54) METHODS AND SYSTEM FOR FORWARDING PACKETS THROUGH A VIRTUAL PRIVATE NETWORK

(71) Applicant: Pismo Labs Technology Limited, Kowloon (HK)

(72) Inventors: Alex Wing Hong Chan, Tai Tam (HK); Yu Yeung, Kowloon (HK); Patrick Ho Wai Sung, Kowloon (HK); Wan Chun Leung, New Territories (HK); Ka Yee Tsang, New Territories (HK)

(73) Assignee: Pismo Labs Technology Limited, Kowloon (HK)

( * ) Notice: Subject to any disclaimer, the term of this patent is extended or adjusted under 35 U.S.C. 154(b) by 593 days.

(21) Appl. No.: 17/778,640

(22) PCT Filed: Jul. 17, 2020

(86) PCT No.: PCT/IB2020/056725
§ 371 (c)(1),
(2) Date: May 20, 2022

(87) PCT Pub. No.: WO2022/013605
PCT Pub. Date: Jan. 20, 2022

(65) Prior Publication Data
US 2023/0006863 A1    Jan. 5, 2023

(51) Int. Cl.
*H04L 12/46*    (2006.01)
*H04L 12/64*    (2006.01)
(52) U.S. Cl.
CPC ...... *H04L 12/4641* (2013.01); *H04L 12/4633* (2013.01); *H04L 12/6418* (2013.01)

(58) Field of Classification Search
CPC ............ H04L 12/4641; H04L 12/4633; H04L 12/6418; H04L 63/0272; H04L 45/02; H04W 48/16; H04W 48/20; H04W 84/12
See application file for complete search history.

(56) References Cited

U.S. PATENT DOCUMENTS

| | | | |
|---|---|---|---|
| 9,762,444 B1 * | 9/2017 | Kim | H04L 63/0823 |
| 2011/0238847 A1 * | 9/2011 | Scott | H04L 67/30 |
| | | | 709/228 |
| 2012/0027002 A1 * | 2/2012 | Jones | H04W 12/088 |
| | | | 370/338 |

(Continued)

FOREIGN PATENT DOCUMENTS

| | | |
|---|---|---|
| CN | 102821068 A * 12/2012 | |
| CN | 107078944 A * 8/2017 | H04L 12/6418 |

OTHER PUBLICATIONS

Li et al., "A Supporting Home Gateway With Multiple Carrier Wireless Access Realizing Method", Dec. 12, 2012, CN, English translation of CN 102821068 (Year: 2012).*

(Continued)

*Primary Examiner* — Michael K Phillips
(74) *Attorney, Agent, or Firm* — Stein IP, LLC

(57) ABSTRACT

The present invention discloses methods and systems for forward packets received from a SSID at a wireless access point to a VPN. The SSID and VPN are associated. The VPN is created according to a VPN profile. When the VPN is established, the SSID is enabled. When the VPN is not established, the SSID is disabled.

20 Claims, 9 Drawing Sheets

(56) References Cited

U.S. PATENT DOCUMENTS

| | | |
|---|---|---|
| 2015/0131430 A1 | 5/2015 | Chan |
| 2016/0073327 A1* | 3/2016 | Clougherty ......... H04L 12/4633 370/254 |
| 2016/0277277 A1 | 9/2016 | Chan et al. |
| 2016/0353353 A1 | 12/2016 | Sung et al. |
| 2017/0187688 A1 | 6/2017 | Hodroj |
| 2017/0353908 A1 | 12/2017 | Sung et al. |
| 2018/0279175 A1* | 9/2018 | Gholmieh ........... H04L 47/6215 |
| 2020/0136951 A1 | 4/2020 | Chan et al. |

OTHER PUBLICATIONS

Chau et al., "Method and System for Through Communication of Slave Gateway", Aug. 18, 2017, CN, English translation of CN 107078944 (Year: 2017).*
International Search Report of International Application No. PCT/IB2020/056725, mailed on Mar. 30, 2021.
Written Opinion of the International Searching Authority of International Application No. PCT/IB2020/056725, mailed on Mar. 30, 2021.
English Language Abstract of CN102821068A.
English Language Abstract of CN107078944A.

* cited by examiner

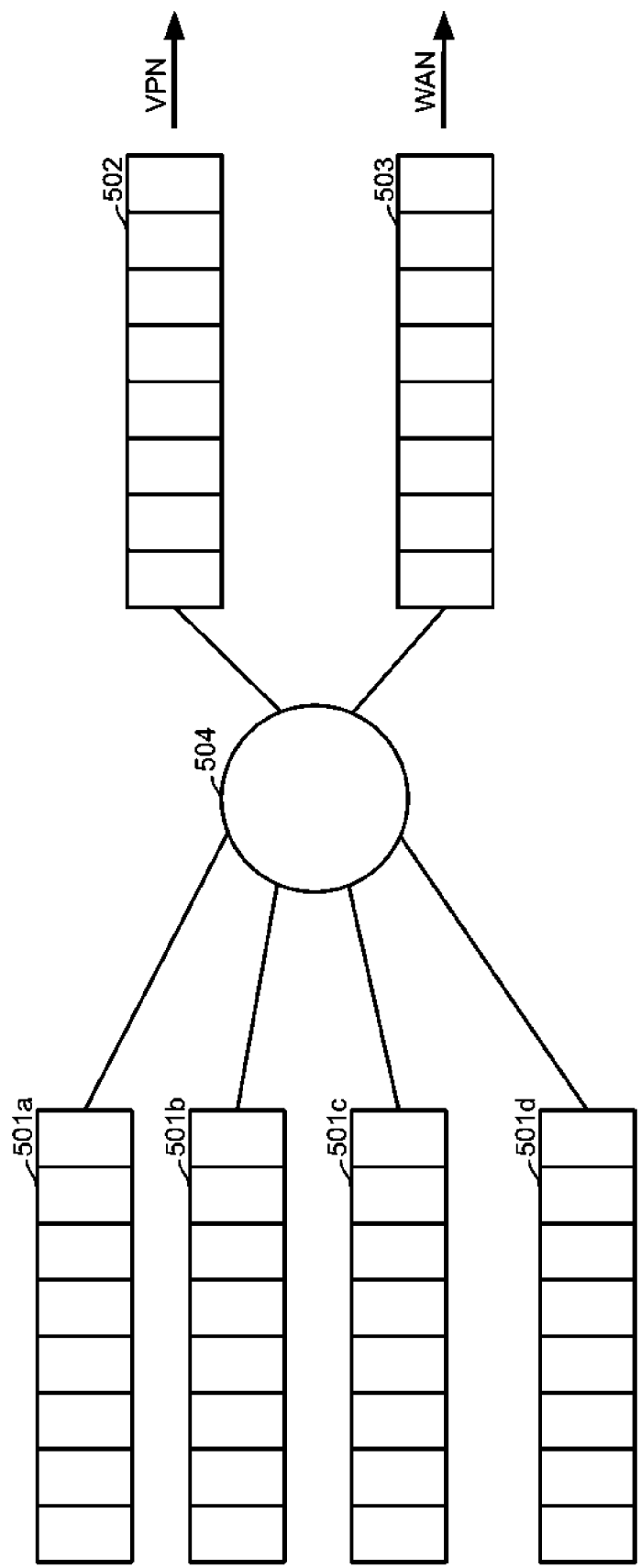

METHODS AND SYSTEM FOR FORWARDING PACKETS THROUGH A VIRTUAL PRIVATE NETWORK

RELATED APPLICATIONS

This patent application is a 371 National Stage entry of Patent Cooperation Treaty application No. PCT/IB2020/056725, filed on Jul. 17, 2020, the contents of which are hereby incorporated by reference in their entirety.

TECHNICAL FIELD

The present invention relates in general to the field of computer networks, more particularly, the present invention relates to methods and systems in which packets sent to a SSID are forwarded to a VPN.

BACKGROUND ART

When an administrator of wireless access point router (AP) tries to route packets received from clients connected to a SSID to a virtual private network (VPN), it is common that the administrator will either (i) create a VLAN for the SSID and then create a routing rule for the VLAN to use the VPN, or (ii) assign IP address for the devices connecting to the SSID with a specific subnet and then create a routing rule for the subnet to use the VP. However, these two approaches are not convenient and may increase additional loading on the CPU and memory. Further, when the VPN is not operating, packets originated from devices connected to the SSID may be dropped or not routed according to the original plan.

SUMMARY OF INVENTION

The present invention discloses a method for establishing a VPN associated with SSID. The method comprises: creating a SSID and at least one VPN profile. Then, the network device establishes a VPN according to the VPN profile. The network device also associates the SSID with the VPN profile. When VPN is established, enabling the SSID and forwarding packets sent to the SSID through the VPN. When the VPN is not established, disabling the SSID.

Technical Problem

The present invention relates in general to the field of computer networks, more particularly, the present invention relates to methods and systems in which packets sent to a SSID are forwarded to a VPN.

BRIEF DESCRIPTION OF DRAWINGS

FIG. 5A illustrates memory structures for logical network interfaces of a wireless access point router (WAPR) according to one of the embodiments of the present invention.

DESCRIPTION OF EMBODIMENTS

Figure 1A:
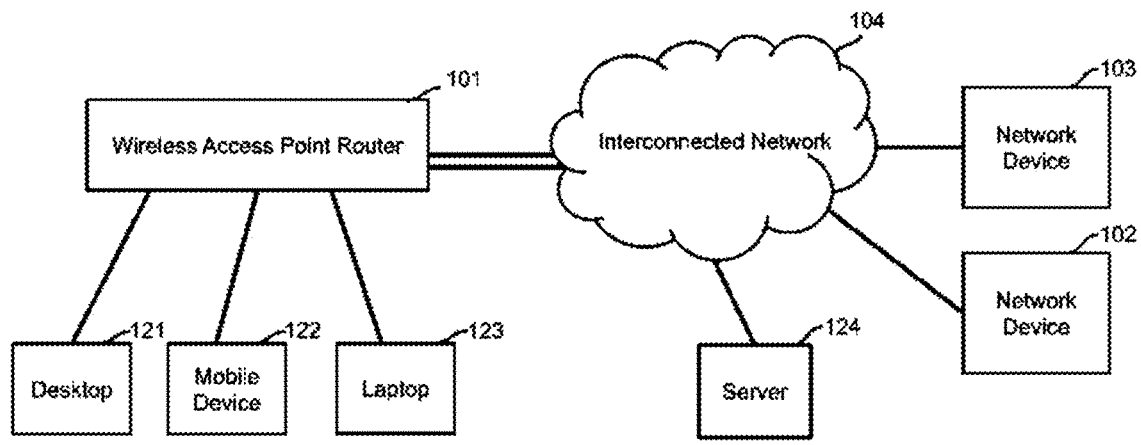
FIG. 1A illustrates an access network according to embodiments of the present invention.

The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention. It is being understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Embodiments, or portions thereof, may be embodied in program instructions operable upon a processing unit for performing functions and operations as described herein. The program instructions making up the various embodiments may be stored in a storage medium.

The program instructions making up the various embodiments may be stored in a storage medium. Moreover, as disclosed herein, the term storage medium may represent one or more devices for storing data, including read-only memory (ROM), programmable read-only memory (PROM), erasable programmable read-only memory (EPROM), random access memory (RAM), magnetic RAM, core memory, floppy disk, flexible disk, hard disk, magnetic tape, CD-ROM, flash memory devices, a memory card and/or other machine-readable mediums for storing information.

The program instructions making up the various embodiments may be stored in a storage medium. Moreover, as disclosed herein, the term "computer readable storage medium" may represent one or more devices for storing data, including read only memory (ROM), programmable read-only memory (PROM), erasable programmable read-only memory (EPROM), random access memory (RAM), magnetic RAM, core memory, floppy disk, flexible disk, hard disk, magnetic tape, CD-ROM, flash memory devices, a memory card and/or other machine readable mediums for storing information. The term "computer readable storage medium" may also include, but is not limited to portable or fixed storage devices, optical storage mediums, magnetic mediums, memory chips or cartridges, wireless channels and various other mediums capable of storing, containing or carrying instruction(s) and/or data. A computer readable storage medium can be realized by virtualization, and can be a virtual computer readable storage medium including a virtual computer readable storage medium in a cloud-based instance.

The term computer-readable medium as used herein refers to any medium that participates in providing instructions to a processing unit for execution. The computer-readable medium is just one example of a machine-readable medium, which may carry instructions for implementing any of the methods and/or techniques described herein. Such a medium may take many forms, including but not limited to, non-volatile media, volatile media, and transmission media. Non-volatile media includes, for example, optical or magnetic disks. Volatile media includes dynamic memory. Transmission media includes coaxial cables, copper wire and fiber optics. Transmission media can also take the form of acoustic or light waves, such as those generated during radio-wave and infra-red data communications.

The storage medium may include a number of software modules that may be implemented as software code to be executed by the processing unit using any suitable computer instruction type. The software code may be stored as a series of instructions or commands, or as a program in the storage medium.

Various forms of computer readable media may be involved in carrying one or more sequences of one or more instructions to the processor for execution. For example, the instructions may initially be carried on a magnetic disk from a remote computer. Alternatively, a remote computer can load the instructions into its dynamic memory and send the instructions to the system that runs the one or more sequences of one or more instructions.

A processing unit may be a microprocessor, a microcontroller, a digital signal processor (DSP), any combination of those devices, or any other circuitry configured to process information.

A processing unit executes program instructions or code segments for implementing embodiments of the present invention. Furthermore, embodiments may be implemented by hardware, software, firmware, middleware, microcode, hardware description languages, or any combination thereof. When implemented in software, firmware, middleware or microcode, the program instructions to perform the necessary tasks may be stored in a computer readable storage medium. A processing unit(s) can be realized by virtualization, and can be a virtual processing unit(s) including a virtual processing unit in a cloud-based instance.

Embodiments of the present invention are related to the use of a computer system for implementing the techniques described herein. In an embodiment, the inventive processing units may reside on a machine such as a computer platform. According to one embodiment of the invention, the techniques described herein are performed by a computer system in response to the processing unit executing one or more sequences of one or more instructions contained in the volatile memory. Such instructions may be read into the volatile memory from another computer-readable medium. Execution of the sequences of instructions contained in the volatile memory causes the processing unit to perform the process steps described herein. In alternative embodiments, hardwired circuitry may be used in place of or in combination with software instructions to implement the invention. Thus, embodiments of the invention are not limited to any specific combination of hardware circuitry and software.

A code segment, such as program instructions, may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Alternatively, hardwired circuitry may be used in place of, or in combination with, software instructions to implement processes consistent with the principles of the invention. Thus, implementations consistent with principles of the invention are not limited to any specific combination of hardware circuitry and software.

A network interface may be implemented by a standalone electronic component or may be integrated with other electronic components. A network interface may have no network connection or at least one network connection depending on the configuration. A network interface may be an Ethernet interface, a frame relay interface, a fiber optic interface, a cable interface, a Digital Subscriber Line (DSL) interface, a token ring interface, a serial bus interface, a universal serial bus (USB) interface, Firewire interface, Peripheral Component Interconnect (PCI) interface, etc.

A network interface may connect to a wired or wireless access network. An access network may carry one or more network protocol data. A wired access network may be implemented using Ethernet, fiber optic, cable, DSL, frame relay, token ring, serial bus, USB, Firewire, PCI, or any material that can pass information. An wireless access network may be implemented using infra-red, High-Speed Packet Access (HSPA), HSPA+, Long Term Evolution (LTE), 5G, WiMax, GPRS, EDGE, GSM, CDMA, WiFi, CDMA2000, WCDMA, TD-SCDMA, BLUETOOTH, WiBRO, Evolution-Data Optimized (EV-DO); Digital Enhanced Cordless Telecommunications (DECT); Digital AMPS (IS-136/TDMA); Integrated Digital Enhanced (iDEN) or any other wireless technologies.

Embodiments, or portions thereof, may be embodied in a computer data signal, which may be in any suitable form for communication over a transmission medium such that it is readable for execution by a functional device (e.g., processing unit) for performing the operations described herein. The computer data signal may include any binary digital electronic signal that can propagate over a transmission medium such as electronic network channels, optical fibers, air, electromagnetic media, radio frequency (RF) links, and the like, and thus the data signal may be in the form of an electrical signal, optical signal, radio frequency or other wireless communication signal, etc. The code segments may, in certain embodiments, be downloaded via computer networks such as the Internet, an intranet, LAN, MAN, WAN, the PSTN, a satellite communication system, a cable transmission system, and/or the like.

FIG. 1A illustrates an access network according to the embodiments of the present invention. The access network includes interconnected networks 104, wireless access point router (WAPR) 101, network device 102, network device 103, server 124 and a plurality of electronic devices. For illustrative purposes, a plurality of electronic devices is desktop 121, mobile device 122 and laptop 123. Desktop 121, mobile device 122 and laptop 123 are connected to WAPR 101 wirelessly or wired through a local area network (LAN) interface. There is no limitation on the type of a plurality of electronic devices, the electronic device may be a computing device, a laptop computer, a mobile phone, a smart-phone, a desktop computer, a personal digital assistant, or any other electronic device that is capable of connecting to a WAPR and to the interconnected network wirelessly. There is no limitation on the number of a plurality of electronic devices. The number of a plurality of electronic devices connected to WAPR 101 may be managed by an administrator of WAPR 101. Server 124 may be a web server, a database server, a host, or a node reachable through interconnected networks 104. Network device 102 and network device 103 may be any device capable of establishing a VPN. For example, network devices 102 and 103 may be routers, gateways, hosts, servers, and VPN concentrators reachable through interconnected networks 104. The details of the WAPR are described in FIG. 1C.

Figure 1B:
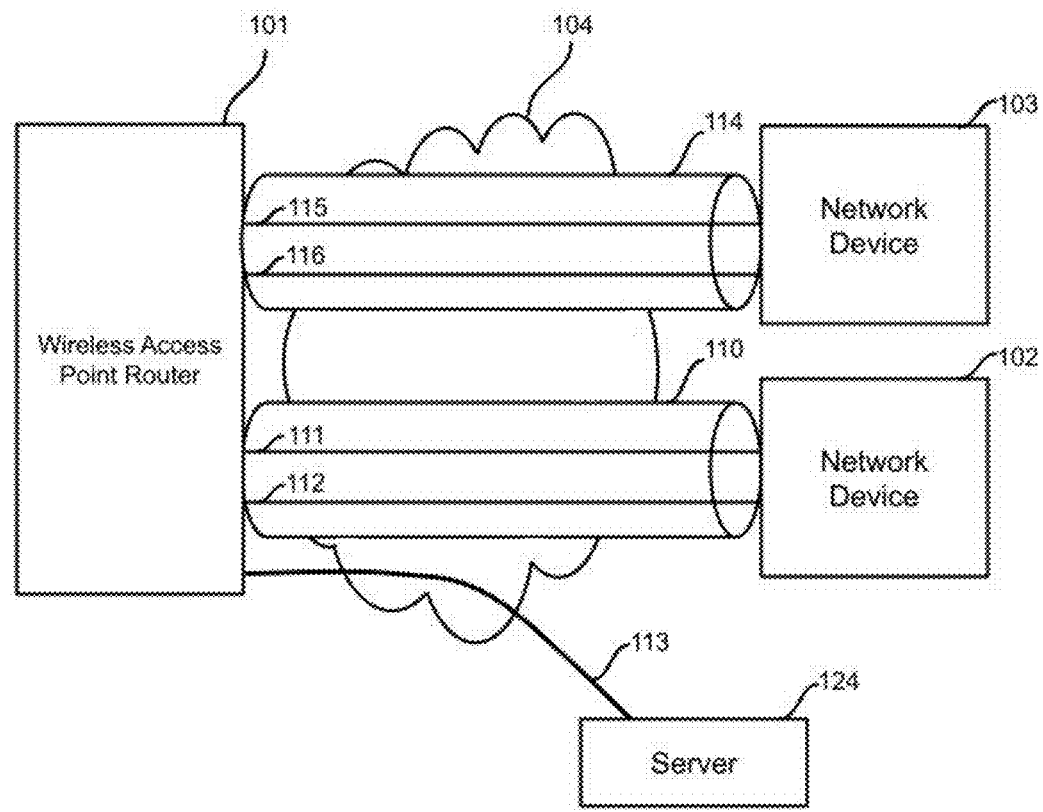
FIG. 1B illustrates a logical connection according to embodiments of the present invention.
Figure 1C:
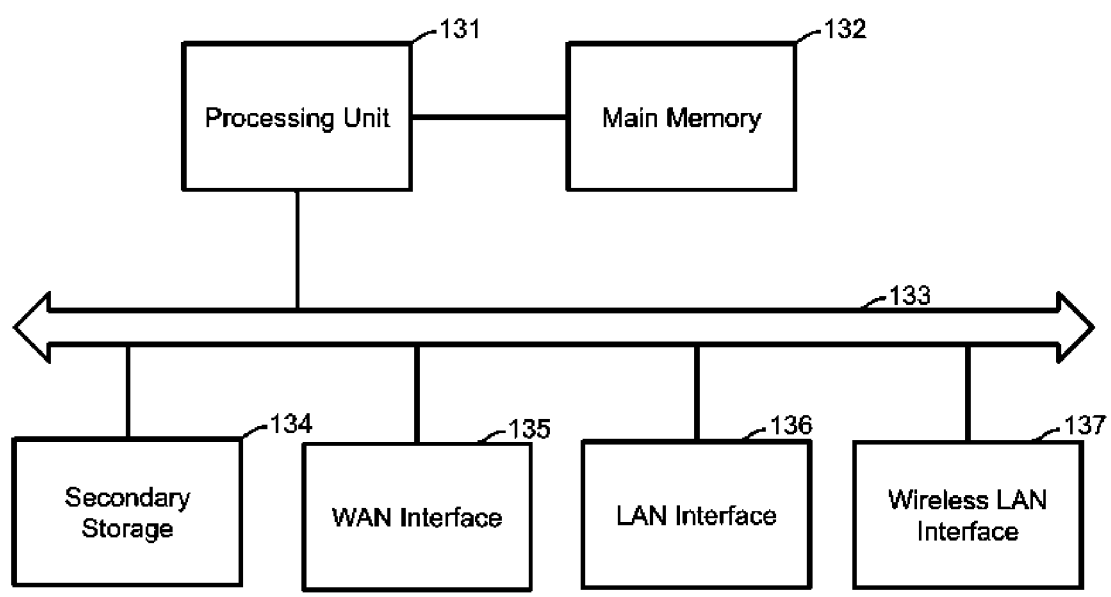
FIG. 1C is a block diagram of a wireless access point router according to the present invention.

FIG. 1C is a block diagram of a WAPR according to the present invention. The WAPR is capable of providing wireless access functions, such as WAPR 101 in FIG. 1A and FIG. 1B. WAPR 101 is a router embedded with access point function, which provides desktop 121, mobile device 122 and laptop 123 an access connection connected to network device 102 or server 124 through interconnected networks 104. WAPR 101 comprises processing unit(s) 131, main memory 132, system bus 133, secondary storage 134, at least one wide area network (WAN) interface, such as WAN interface 135, at least one LAN interface, such as LAN interface 136 and at least one wireless LAN interface, such as wireless LAN interface 137. Secondary storage 134 and main memory 132 are computer readable storage media. Processing unit 131 and main memory 132 may connect to each other directly or through a bus, such as system bus 133. System bus 133 connects processing unit 131 directly or indirectly to secondary storage 134, WAN interface 135, LAN interface 136 and wireless LAN interface 137. Using system bus 133 allows WAPR 101 to have increased modularity. System bus 133 may be any of several types of bus structures including a memory bus, a peripheral bus, and a local bus using any of a variety of bus architectures. Secondary storage 134 stores program instructions for execution by processing unit 131. The scope of the invention is not limited to WAPR 101 having three network interfaces, such that WAPR 101 may have more or less network interfaces. WAN interface 135, LAN interface 136 and wireless LAN interface 137 are specified for illustrative purposes only. Other components which may be utilized within WAPR 101 include amplifiers, board level electronic components, as well as media processors and other specialized SoC or ASIC devices. Support for various processing layers and protocols (e.g., 802.3, DOCSIS MAC, DHCP, SNMP, H.323/RTP/ RTCP, VoIP, SIP, etc.) may also be provided as required. In one example, at least one cellular modem is used for providing WAN connectivity. The cellular modem may be coupled to processing unit 131 through a bus.

FIG. 1B illustrates the logical connection between devices in the access network according to the embodiments of the present invention. WAPR 101 is capable of establishing connections with network device 102, network device 103 and server 124 through interconnected networks 104. For illustration purposes as illustrated in FIG. 1B, aggregated end-to-end connections 110 is established between WAPR 101 and network device 102, and aggregated end-to-end connection 114 is established between WAPR 101 and network device 103. As an aggregated end-to-end connection comprises at least one tunnel, each of aggregated end-to-end connections 110 and 114 may comprise a plurality of tunnels. For illustration purposes, aggregated end-to-end connections 110 comprises tunnels 111 and 112, and aggregated end-to-end connection 114 comprises tunnels 115 and 116. Tunnels 111 and 112 are established between WAPR 101 and network device 102. Tunnels 115 and 116 are established between WAPR 101 and network device 103. A tunnel is an end-to-end connection and may be used as an end-to-end connection. WAPR 101 may use TCP, UDP or other communication protocols as the communication protocol to establish an end-to-end connection. There is no limitation that an aggregated end-to-end connection must comprise two tunnels. For example, an aggregated end-to-end connection may comprise three, seven or twenty tunnels. There is also no limitation that WAPR 101 is only able to establish two aggregated end-to-end connections. It is possible for WAPR 101 to establish no aggregated end-to-end connection, one aggregated end-to-end connection or more than two aggregated end-to-end connections.

There is no limitation on the number of end-to-end connections established between WAPR 101 and network device 102 or the number of end-to-end connections established between WAPR 101 and network device 103. In one example, not illustrated in FIG. 1B, only one end-to-end connection is established between WAPR 101 and network device 102. In another example, not illustrated in FIG. 1B, five end-to-end connections are established between WAPR 101 and network device 102. In one example, two end-to-end connections are established between WAPR 101 and network device 103. In one example, not illustrated in FIG. 1B, ten end-to-end connections are established between WAPR 101 and network device 103.

For illustration purposes, logical connection 113 is illustrated in FIG. 1B and is established between WAPR 101 and server 124. There is no limitation on the type of connection established between WAPR 101 and network device 102. WAPR 101 may use TCP, UDP or other communication protocols as the communication protocol to establish the connection.

In one variant, at least one tunnel of the aggregated end-to-end connections is established using a cellular connection. The cellular connection is established using a cellular modem of WAPR 101.

Figure 2:
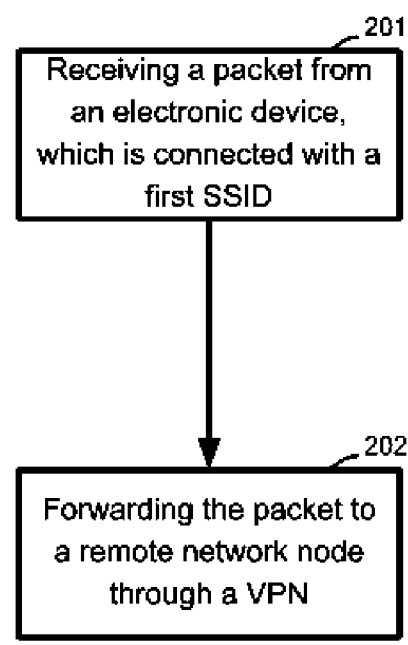
FIG. 2 is a flowchart illustrating processes of forwarding packets through a VPN according to embodiments of the present invention.

FIG. 2 is a flowchart illustrating processes of forwarding packets through a VPN according to embodiments of the present invention. At process 201, the processor of WAPR 101 receives a packet from an electronic device, such as desktop 121, mobile device 122 and laptop 123. The electronic device is connected to WAPR 101 through a first SSID. The first SSID is associated with a VPN, such as end-to-end connection 110. It is possible that there is a plurality of SSID enabled and a plurality of VPN established. end-to-end connection 110 is created based on a first VPN profile. Alternatively, the first SSID is associated with the first VPN profile. As long as the processor of WAPR 101 is able to associate the first SSID with aggregated end-to-end connection 110, the processor of WAPR 101 is then able to forward the packet to a network device, such as network device 102, through the first VPN at process 202. There is no difference whether the first SSID is associated with, assigned for or configured for the first VPN. There is also no difference whether the first VPN is associated with, assigned for or configured for the first SSID. As long as the processor of WAPR 101 is able to forward packets sent to the first SSID to the first VPN, association, assignment, configuration or similar actions may be performed between the first SSID and the first VPN. There is also no limitation that there is one SSID and one VPN association. For example, there may be a second SSID associated with a second VPN, such that the processor of WAPR 101 will forward packets sent to the second SSID to the second VPN.

Packets received from electronic devices connecting to the first SSID will all be forwarded to network device 102 through aggregated end-to-end connection 110. Alternatively, the processor of WAPR 101 will forward some of the packets to network device 102 through aggregated end-to-end connection 110 and forward some of the packets not through aggregated end-to-end connection 110 based on one or more outbound policies.

In one example, the processor of WAPR 101 has assigned or created a logical network interface for the first SSID when the first SSID is enabled. The processor of WAPR 101 has also assigned or created another logical network interface for the VPN or the aggregated end-to-end connection when the VPN or the aggregated end-to-end connection is established. The processor of WAPR 101 may then forward packets received from the logical network interface for the first SSID to the logical network interface for the VPN or the aggregated end-to-end connection. Such that, there is no need to use VLAN or tag to distinguish the packets sent to the first SSID. There is also no need to create an outbound policy based on the internet protocol (IP) address or media access control (MAC) address of the electronic devices, which sends the packets to the first SSID.

Figure 3A:
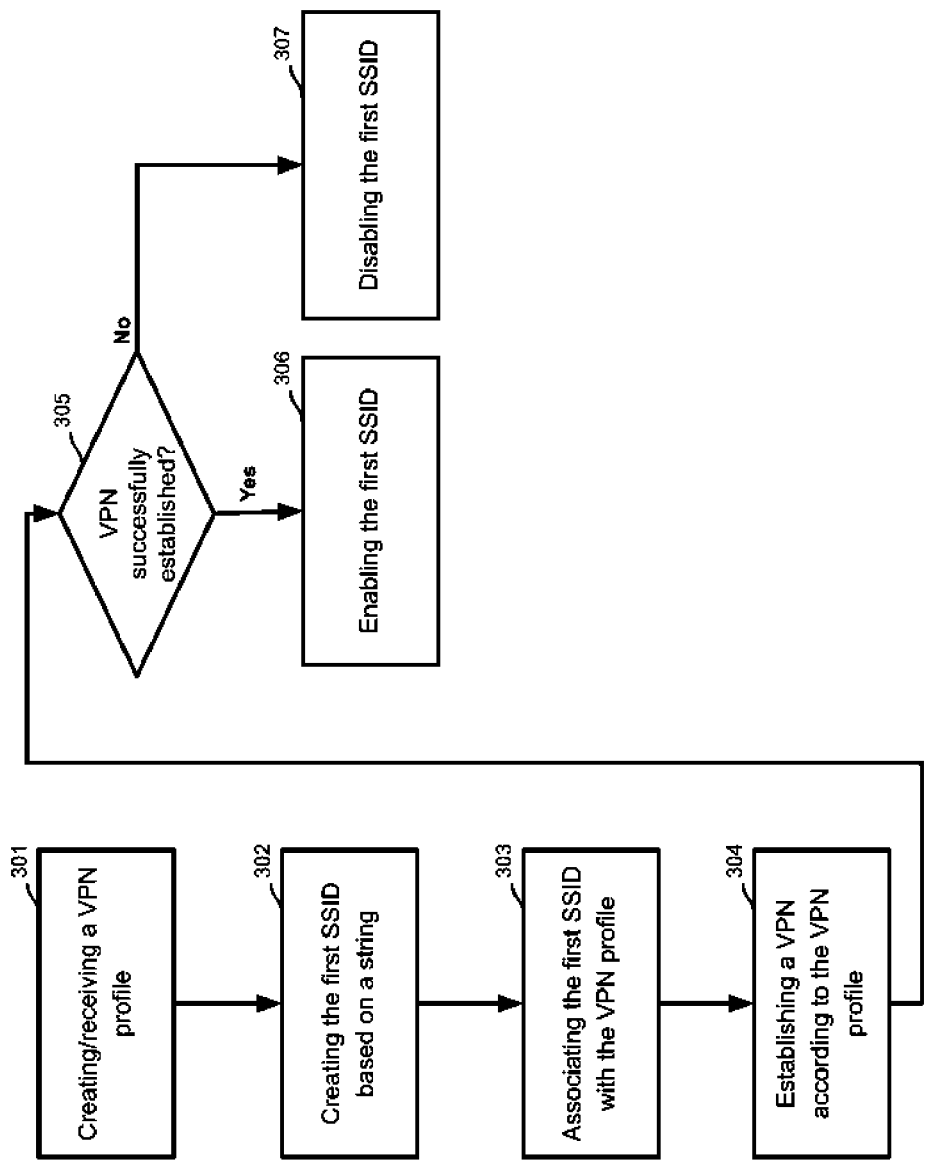
FIG. 3A is a flowchart illustrating processes of enabling or disabling a SSID according to one of the embodiments of the present invention.

FIG. 3A is a flowchart illustrating processes of enabling or disabling a SSID according to one of the embodiments of the present invention. At process 301, the processor of WAPR 101 creates or receives a VPN profile. The VPN profile may be created according to the information inputted by the administrator of WAPR 101 or information received from a remote server. The VPN profile may also be received from the administrator of WAPR 101 or received from a remote server. The VPN profile may comprise information, such as IP address of WAPR 101, WAN interface of WAPR 101, IP address of network device 102, security protocol, password and security certificate, to facilitate the creation of a VPN, For illustrative purposes, the VPN profile is to establish a VPN between WAPR 101 and network device 102. In one example, the VPN profile comprises information to create an aggregated end-to-end connection, and the information may include IP addresses of a plurality of WAN interfaces of WAPR 101 and/or IP addresses of a plurality of WAN interfaces of network device 102. In one example, the VPN profile comprises information to identify a cellular modem of WAPR 101 or the WAN connection established using the cellular modem.

At process 302, the processor of WAPR 101 creates a SSID based on a string and SSID related parameters, such as password, authentication server information and authentication method. The string and parameters may be provided by the administrator of WAPR 101 or retrieved from a remote server.

At process 303, the processor of WAPR 101 associates the SSID with the VPN profile. The association may be indicated by storing information in a computer-readable storage. The association may also be indicated by configuring the routing table of WAPR 101. The association may also be achieved by creating an outbound policy. The association may also be achieved by forwarding packets received from the logical network interface of the SSID to the logical network interface of the VPN to be created according to the VPN profile.

At process 304, the processor of WAPR 101 creates a VPN according to the VPN profile. The VPN may comprise one tunnel only. A tunnel may be established between a WAN interface of WAPR 101 and a WAN interface of network device 102. The VPN may comprise a plurality of tunnels, such that the VPN is aggregated end-to-end connection. The plurality of tunnels may be established using one or more WAN interfaces of WAPR 101 and one or more WAN interfaces of network device 102.

At process 305, the processor of WAPR 101 decides whether the VPN is created and successfully established. If the VPN is successfully established, the processor of WAPR 101 will enable the SSID at step 306. If the VPN is not successfully established, the processor of WAPR 101 will disable the SSID at process 307. In one variant, process 305 is performed continuously in order to detect if the VPN is still established.

When a SSID is enabled, the SSID may allow electronic devices to connect to it. The SSID may be broadcasted. Alternatively, the SSID may be hidden and only allow those electronic devices already know the SSID to connect to it. On the other hand, when the SSID is disabled, the SSID may not allow electronic devices to connect to it. The SSID may not be broadcasted. When the SSID is created at process 302, the SSID may not be enabled yet.

In one variant, processes 306 or 307 are not performed immediately after process 305. The processor of WAPR 101 may wait for a time threshold in order to ensure the VPN is indeed established or not established. It is common that a VPN may be interrupted momentarily. If a SSID is immediately disabled after a VPN becomes unstable, electronic devices connected to the SSID may lose connection and may connect to another SSID. The preferred time threshold should be smaller than 3 seconds and not more than 5 minutes. The waiting time using the time threshold may help to reduce the possibility that the SSID is toggled between being enabled and being disabled in a short period of time.

For example, when the VPN is created using an aggregated end-to-end connection and one of the tunnels is established using a cellular connection, the performance of the aggregated end-to-end connections may fluctuate as performance of a cellular connection may not be stable. When the aggregated end-to-end connection is not established, the SSID may then be disabled. In one variant, even the aggregated end-to-end connections are still established but the network performance of the aggregated end-to-end is not satisfactory, the SSID may then be disabled. The network performance may be based on latency, packet drops, bandwidth and errors. The level of satisfaction may be configured by the administrator of WAPR 101 and/or retrieved from a remote server.

In one variant, after processes 306 or 307, process 305 will be performed again in order to monitor the status of the VPN and allow the SSID to be re-enabled or to be disabled as the status of VPN changes.

In one variant, instead of disabling the SSID at process 307, the SSID is still enabled but is not broadcasted. In one variant, instead of disabling the SSID at process 307, the SSID is still broadcasted but will not accept connections. In one variant, instead of disabling the SSID at process 307, the SSID is still broadcasted and accepts connections, but the processor will not forward packets.

There is no limitation that all the processes must be performed sequentially or in the order illustrated. For example, process 302 may be performed before process 301; and process 304 may be performed right after process 301. Therefore, before a SSID is associated with the VPN profile/connection, the VPN based on the VPN profile is already established. In another example, processes 301 and 302 may be performed together and the administrator may create the VPN profile and SSID on the same web page or using one single command.

Figure 3B:
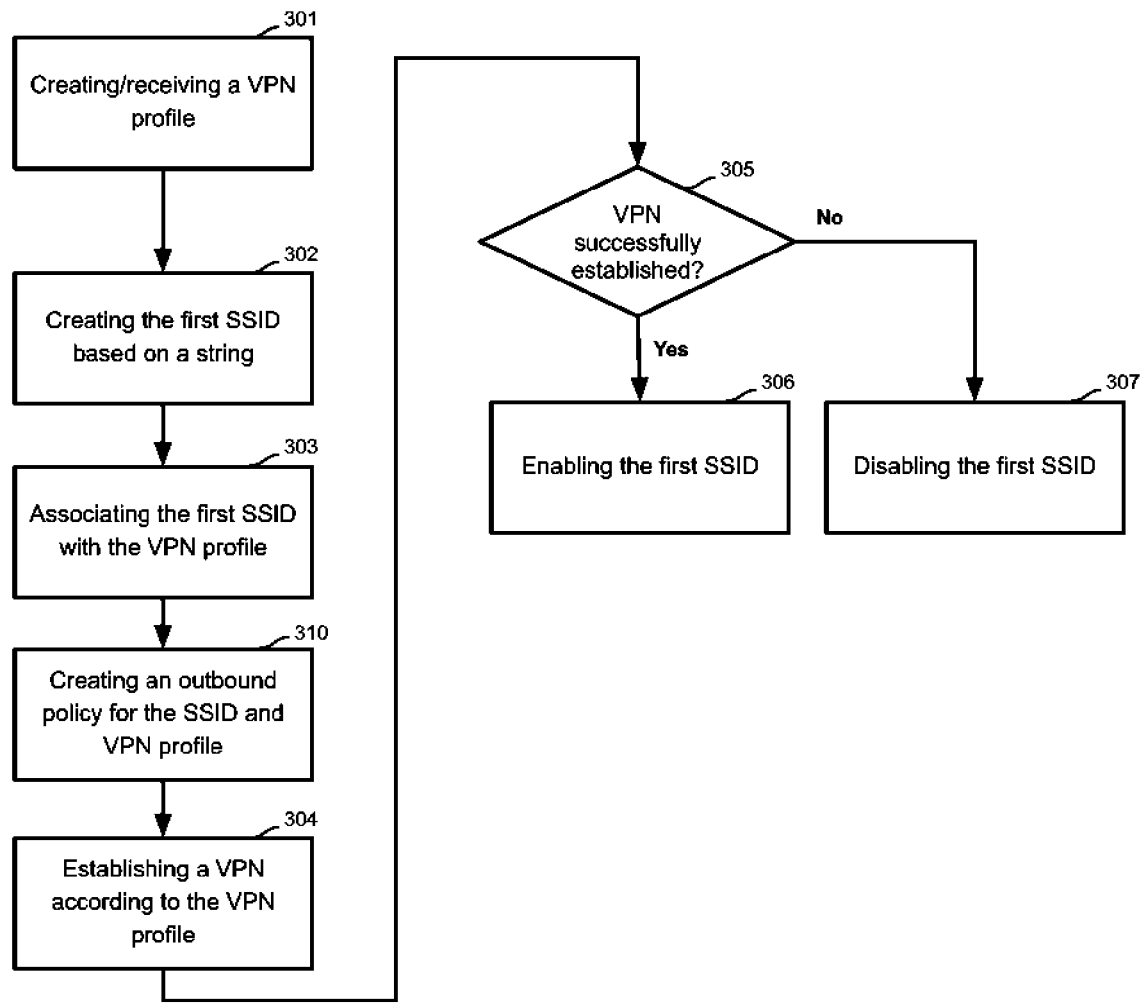
FIG. 3B is a flowchart illustrating processes of enabling or disabling a SSID according to one of the embodiments of the present invention.

FIG. 3B is a flowchart illustrating processes of enabling or disabling a SSID according to one of the embodiments of the present invention. FIG. 3B is similar to FIG. 3A, except the addition of process 310. At process 310, an outbound policy is created or enabled to associate the SSID with the VPN by the processor of WAPR 101. Alternatively, the outbound policy may be inputted by the administrator of WAPR 101 or retrieved from a remote server. In one variant, after the outbound policy is created, the outbound policy is not enforced until the VPN is established. The outbound policy may be a set of instructions for the processor of WAPR 101 directly, or a set of instructions to a network processor of WAPR 101, a set of routing rules being executed by the processor of WAPR 101 or the network processor of WAPR 101. It is also possible to have the outbound policy first being executed by the processor of WAPR 101 and then executed by the network processor of WAPR 101.

Figure 4:
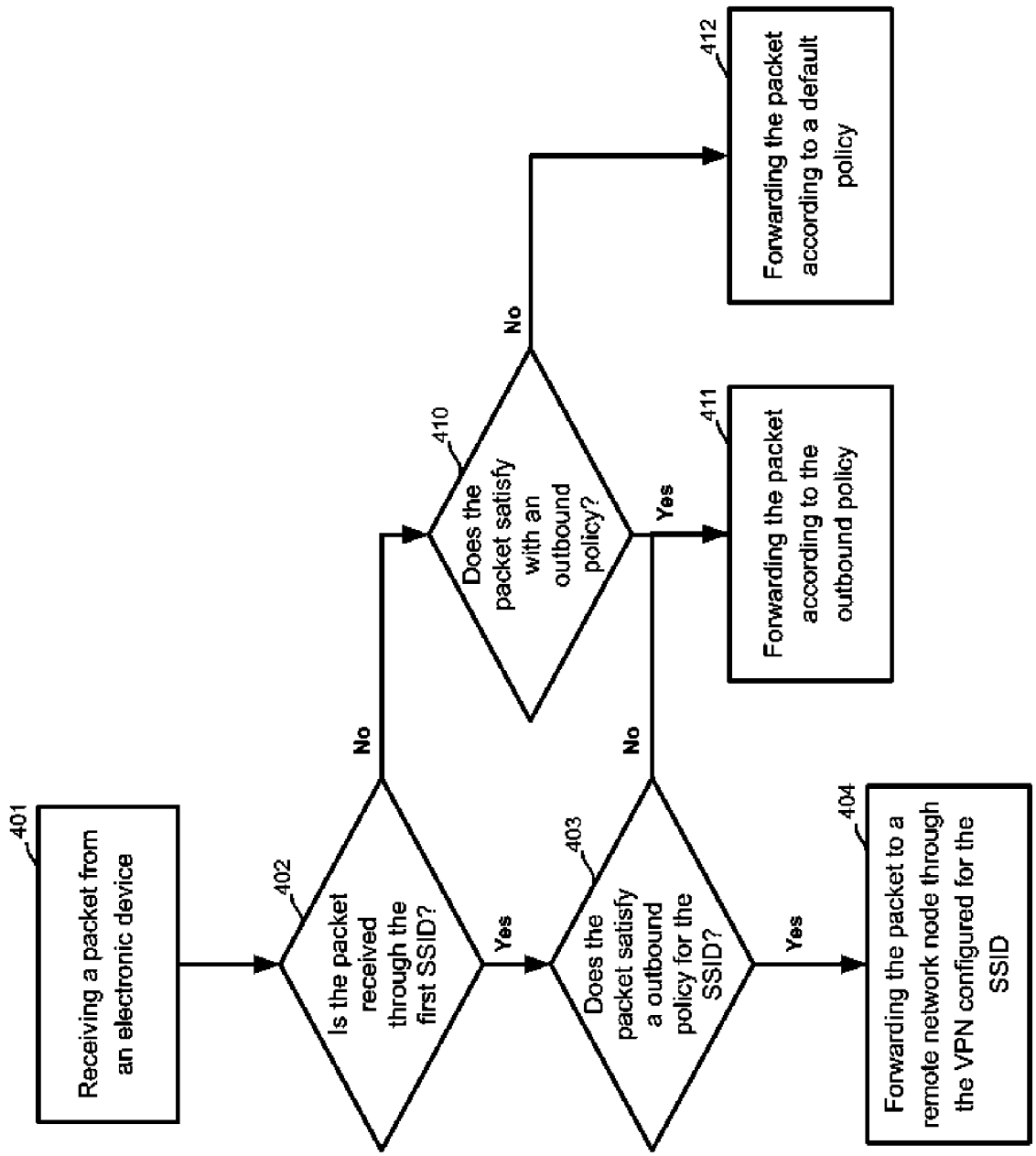
FIG. 4 is a flowchart illustrating processes of using outbound policy for forwarding packets according to one of the embodiments of the present invention.

FIG. 4 is a flowchart illustrating processes of using outbound policy for forwarding packets according to the embodiments of the present invention. At process 401, WAPR 101 receives a packet. At process 402, the processor of WAPR 101 determines if the packet is received from a first SSID. If the packet is received from the first SSID, the processor of WAPR 101 determines if the packet satisfies all conditions of an outbound policy for the SSID, if there is a such outbound policy and the packet does not satisfy the conditions, process 411 will be performed. Otherwise process 404 will be performed to forward the packet to network device 102 through a VPN or an aggregated end-to-end connection, such as aggregated end-to-end 110, configured for the SSID at process 303. If the packet is not received from the first SSID, process 410 will be performed. The outbound policy at process 403 may be based on many factors, including destination IP address, source IP address, source IP port number, destination IP port number, MAC address of the electronic device sending the packet, protocol, time, and availability of a WAN interface. In one variant, the outbound policy is to forward all packets received by the first SSID to the VPN.

At process 410, the processor of WAPR 101 determines if the packet, which is not received by a SSID, satisfied all conditions of one of the outbound policies, If the packet satisfies with all conditions of one of the outbound policies, process 411 will be performed and the packet will be forwarded according to the satisfied outbound policy. If the packet does not satisfy any of the outbound policies, process 412 will be performed and the packet will be forwarded according to a default policy.

When the packet satisfies all conditions of a plurality of outbound policy, the outbound policy that has the higher priority will be enforced.

FIG. 5A illustrates memory structure for logical network interfaces of a WAPR according to one of the embodiments of the present invention. When packets are arrived from a LAN logical network interface, the packets will be stored in the respective queue 501. For example, queue 501*a* is for storing packets received from a first LAN, queue 501*b* is for storing packets received from a first SSID, queue 501*c* is for storing packets received from a second LAN, and queue 501*d* is for storing packets received from a second SSID.

When the packets are ready to be sent to a logical network interface, the packets will also be stored at the respective queue of the logical network interface. For example, queue 502 is for storing packets to be sent to a VPN and queue 503 is for storing packets to be sent to a WAN logical network interface. When the first SSID is associated with the VPN, processor 504 forwards packets from queue 501*b* to queue 502.

Packets from queues 501*a*, 501*c* and 501*d* will not be forwarded to queue 502 unless these packets satisfy conditions for an outbound policy and the outbound policy is configured to forward packets satisfying the conditions to the VPN. Otherwise, these packets are forwarded to queue 503.

Similarly packets from queue 501*b* will not be forwarded to queue 503 unless these packets satisfy all conditions for an outbound policy and the outbound policy is configured to forward packets satisfying the conditions to the WAN. Otherwise, these packets are forwarded to queue 502.

There is no limitation on the implementation of processor 504. Processor 504 may be implemented by processing unit 131 in FIG. 1C. Processor 504 may be a CPU or a network processor. A processor that is capable of accessing the queue and deciding which queue a packet should be forwarded to could be selected to be used as processor 504. There is also no limitation that processor 504 must be one single processor. Processor 504 may comprise a plurality of processing units or processors.

Figure 5B:
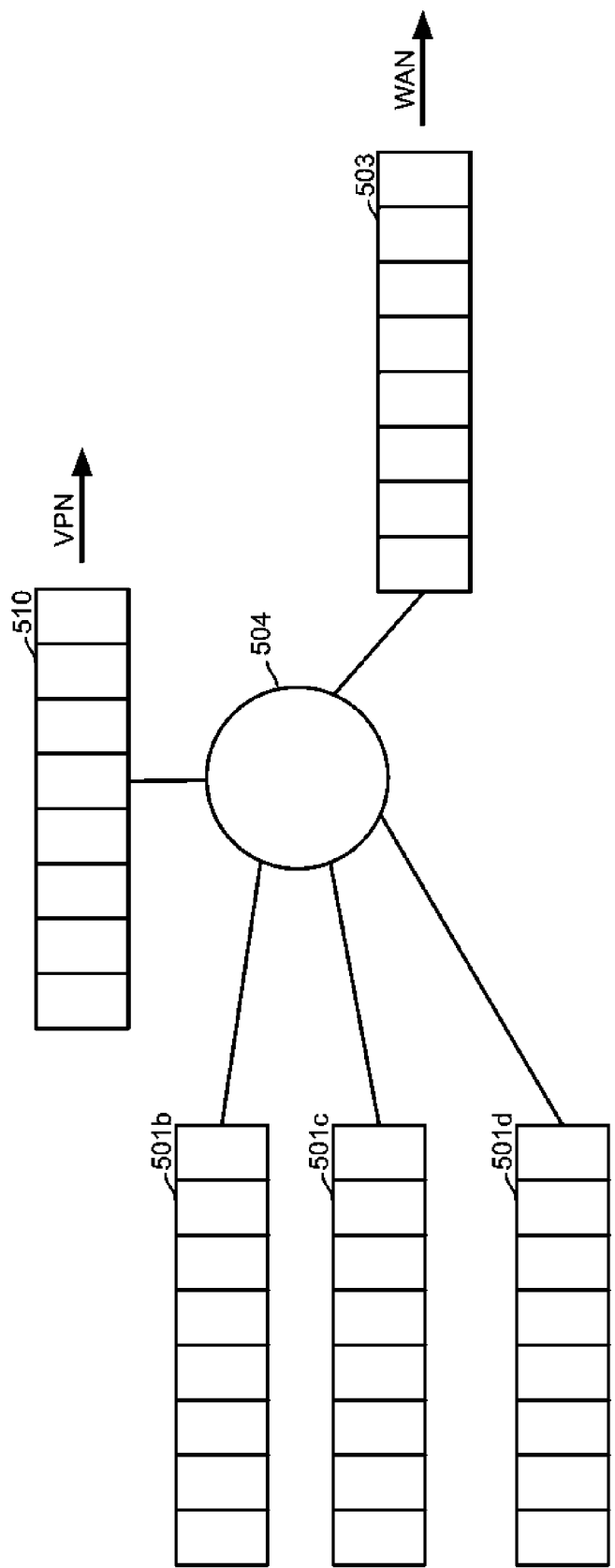
FIG. 5B illustrates memory structures for logical network interfaces of a WAPR according to one of the embodiments of the present invention.

FIG. 5B illustrates memory structure for logical network interfaces of a WAPR according to one of the embodiments of the present invention. FIG. 5B is similar to FIG. 5A, except that queues 501*a* and 502 are replaced by queue 510. As packets received by the SSID associated with a VPN will be forwarded to the VPN, there is no need to have separate queues. When packets are received by the SSID, the processor of WAPR 101 will store the packets in queue 510. When the VPN is ready for sending a packet, the processor of WAPR 101 will retrieve the earliest packet in queue 510 for sending through the VPN.

Figure 6A:
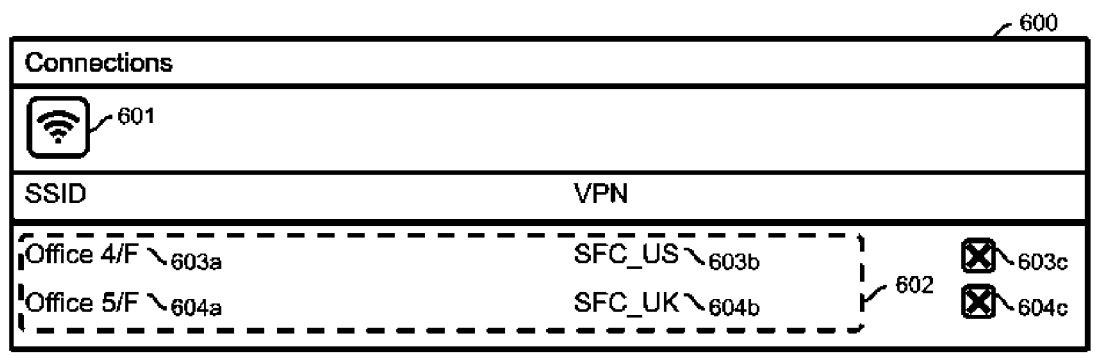
FIG. 6A illustrates a user interface for displaying the established VPN according to embodiments of the present invention.

FIG. 6A illustrates a user interface for displaying the established VPN according to embodiments of the present invention. The user interface may be realized in a webpage, in an LCD screen, in an OLED screen, or in a control panel. The user interface may be sent through using networking technologies, a serial console or a bus connection. A summary of the established VPN may be visually displayed in connection list area 602. In view of the access network in FIG. 1B, for illustrative purposes, VPN "SFC_US" 603B is used to illustrate the identity of aggregated end-to-end connection 110. SSID ("Office 4/F") 603*a* is in the same row with VPN "SFC_US" 603B to illustrate that SSID "Office 4/F" 603*a* is associated with VPN "SFC_US" 603B. Similarly, for illustrative purposes, VPN "SFC_UK" 604B is used to illustrate the identity of aggregated end-to-end connection 114. SSID ("Office 5/F") 604*a* is in the same row with VPN "SFC_UK" 604B to illustrate that SSID "Office 5/F" 604*a* is associated with VPN "SFC_UK" 604B.

Alternatively, instead of displaying established VPNs, the user interface may display VPN profiles, regardless if a VPN is established using a respective VPN profile. There is no limitation that only the above-mentioned information is displayed in the connection list area 602. The vendor of WAPR 101 or administrator of WAPR 101 may configure WAPR 101 to display more or less information in the connection list area 602.

Buttons may be provided to the administrator for creating or deleting a VPN associated with SSID. For example, button 601 is provided to the administrator for creating a VPN associated with SSID. For example, dialog box 610 is displayed if button 601 clicked. In another example, buttons 603*c* and 604*c* are provided to the administrator for deleting the corresponding VPN associated with SSID listed in connection list area 602. There is no limitation on the methods for the administrator to create or delete the VPN associated with SSID.

Figure 6B:
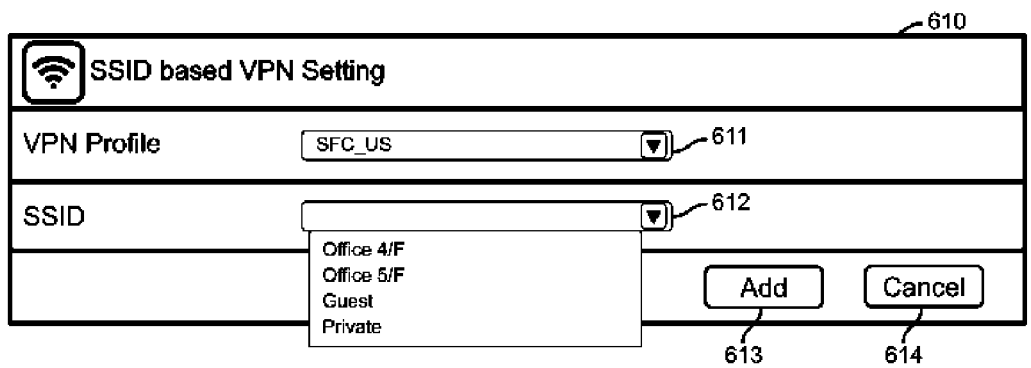
FIG. 6B illustrates a dialog box for creating a VPN associated with SSID according to the embodiments of the present invention.

FIG. 6B illustrates a dialog box for associating a VPN profile with a SSID according to the embodiments of the present invention. The dialog box 610 comprises drop-down list 611, drop-down list 612, button 613 and button 614. Dialog box 610 is triggered and displayed when receiving a request from an administrator for associating a VPN profile associated with SSID. For example, Dialog box 610 is triggered and displayed when button 601 of the user interface shown in FIG. 6A is clicked. Drop-down list 611 allows the administrator to select a VPN profile. For example, "SFC_US" and "SFC_UK" are the VPN profiles that may be selected by the administrator. Drop down list 612 allows the administrator to select a SSID. For example, "Office 4/F" and "Office 5/F" are the SSIDs that may be selected by the administrator. Button 613 is provided to the administrator for associating a VPN profile with SSID based on the selections in drop-down lists 611 and 612. Button 614 is provided to the administrator and returns to the user interface shown in FIG. 6A without establishing any VPN associated with SSID.

After an association is formed, a VPN will be created according to the selected VPN profile. In one example, the VPN created is an aggregated end-to-end connection. In one variant, the VPN is already established before it is associated with the selected corresponding SSID.

In one variant, a SSID will not be shown in drop down list 612 if the SSID is already selected and a VPN associated with SSID is already established.

In one variant, the VPN profile is not shown in drop down list 611 if the VPN profile is selected and a VPN associated with SSID is established. Alternatively, the VPN profile is shown in drop down list 611 even the VPN profile is selected and a VPN associated with SSID is established.

The user interface illustrated in FIG. 6A and FIG. 6B may be produced by processing unit 131. The user interface may also be first produced by another device and then sent to the user or WAPR 101. For example, a user logs on to a remote server to access the user interface. Then the remote server sends the information provided by the user to WAPR 101 to create the SSID, to create the VPN and to associate the SSID and the VPN.

There is no limitation that the same processing unit will create the user interface, create outbound policy and perform the forwarding process by processor 504. One or more processing units could be used together. Alternatively, one or more processing units may be separately to perform different processes disclosed in the present invention.

The invention claimed is:

1. A method of establishing a Virtual Private Network (VPN), comprising:
   (a) creating a Service Set Identifier (SSID);
   (b) creating at least one VPN profile, wherein the at least one VPN profile comprises: information of a Wide Area Network (WAN) interface, wherein the WAN interface is either an Ethernet interface or a cellular modem;
   (c) establishing a VPN according to the VPN profile;
   (d) associating the SSID with the VPN profile;
   (e) when the VPN is established:
      (i) enabling the SSID;
      (ii) forwarding packets sent to the SSID through the VPN;
      (iii) storing the packets sent to the SSID in a first queue and forwarding the packets stored in the first queue to a second queue; wherein the second queue is for storing packets to be sent by the VPN; and
   (f) when the VPN is not established, disabling the SSID.

2. The method of claim 1, wherein the VPN comprises a plurality of tunnels.

3. The method of claim 2, wherein at least one tunnel of the plurality of tunnels is established using a cellular modem.

4. The method of claim 1, further comprising providing a user interface for selecting the SSID and selecting the VPN.

5. The method of claim 1, further comprising retrieving the VPN profile from a remote server.

6. The method of claim 1, further comprising retrieving information for creating the SSID from a remote server.

7. The method of claim 1, further comprising before performing step (f) when the VPN is not established, waiting for a time period for confirming the VPN is not established.

8. The method of claim 1, further comprising: creating an outbound policy to perform step (d).

9. A method of establishing a Virtual Private Network (VPN), comprising:
   (a) selecting a Service Set Identifier (SSID);
   (b) selecting a VPN;
   (c) associating the SSID with the VPN;
   (d) when the VPN is established:
      (i) enabling the SSID;
      (ii) forwarding packets sent to the SSID through the VPN;
      (iii) storing the packets sent to the SSID in a first queue and forwarding the packets stored in the first queue to a second queue; wherein the second queue is for storing packets to be sent by the VPN; and
   (e) when the VPN is not established, disabling the SSID; wherein:
      the VPN comprises a plurality of tunnels; and
      at least one tunnel of the plurality of tunnels is established using a cellular modem.

10. The method of claim 9, wherein the SSID and the VPN are selected from drop-down lists in a user interface.

11. The method of claim 9, further comprising retrieving information for creating the SSID and creating the VPN from a remote server.

12. The method of claim 9, further comprising disabling the SSID when performance of the VPN is not satisfactory.

13. A network device, comprising:
   at least one Wide Area Network (WAN) interface;
   at least one wireless Local Area Network (LAN) interface;

at least one processing unit;
at least one main memory coupled to the at least one processing unit;
at least one non-transitory computer readable storage medium coupled to the at least one processing unit and storing program instructions configured to cause the at least one processing unit to perform:
  (a) creating a Service Set Identifier (SSID);
  (b) creating at least one Virtual Private Network (VPN) profile, wherein the at least one VPN profile comprises: information of the WAN interface, wherein the WAN interface is either an Ethernet interface or a cellular modem;
  (c) establishing a VPN according to the VPN profile;
  (d) associating the SSID with the VPN profile;
  (e) when the VPN is established:
    (i) enabling the SSID;
    (ii) forwarding packets sent to the SSID through the VPN;
    (iii) storing the packets sent to the SSID in a first queue and forwarding the packets stored in the first queue to a second queue; wherein the second queue is for storing packets to be sent by the VPN; and
  (f) when the VPN is not established, disabling the SSID.

14. The network device of claim 13, wherein the VPN comprises a plurality of tunnels.

15. The network device of claim 14, wherein at least one tunnel of the plurality of tunnels is established using a cellular modem.

16. The network device of claim 13, wherein the at least one non-transitory computer readable storage medium further storing program instructions executable by the at least one processing unit for:
  providing a user interface for selecting the SSID and selecting the VPN.

17. The network device of claim 13, wherein the at least one non-transitory computer readable storage medium further storing program instructions executable by the at least one processing unit for:
  retrieving the VPN profile from a remote server.

18. The network device of claim 13, wherein the at least one non-transitory computer readable storage medium further storing program instructions executable by the at least one processing unit for:
  retrieving information for creating the SSID from a remote server.

19. The network device of claim 13, wherein the at least one non-transitory computer readable storage medium further storing program instructions executable by the at least one processing unit for:
  before performing step (f) when the VPN is not established, waiting for a time period for confirming the VPN is not established.

20. The network device of claim 13, wherein the at least one non-transitory computer readable storage medium further storing program instructions executable by the at least one processing unit for:
  creating an outbound policy to perform step (d).

* * * * *